United States Patent
Watanabe et al.

(10) Patent No.: US 9,755,563 B2
(45) Date of Patent: Sep. 5, 2017

(54) INVERTER CONTROL APPARATUS AND INVERTER APPARATUS

(71) Applicant: MITSUBISHI HEAVY INDUSTRIES AUTOMOTIVE THERMAL SYSTEMS CO., LTD., Kiyosu-shi, Aichi (JP)

(72) Inventors: Kyohei Watanabe, Tokyo (JP); Kenichi Aiba, Tokyo (JP); Takayuki Takashige, Aichi (JP)

(73) Assignee: MITSUBISHI HEAVY INDUSTRIES AUTOMOTIVE THERMAL SYSTEMS CO., LTD., Kiyosu-Shi, Aichi (JP)

( * ) Notice: Subject to any disclaimer, the term of this patent is extended or adjusted under 35 U.S.C. 154(b) by 0 days.

(21) Appl. No.: 15/115,415

(22) PCT Filed: Feb. 23, 2015

(86) PCT No.: PCT/JP2015/055102
§ 371 (c)(1),
(2) Date: Jul. 29, 2016

(87) PCT Pub. No.: WO2015/133317
PCT Pub. Date: Sep. 11, 2015

(65) Prior Publication Data
US 2017/0005608 A1 Jan. 5, 2017

(30) Foreign Application Priority Data
Mar. 4, 2014 (JP) .................................. 2014-042072

(51) Int. Cl.
*H02P 27/04* (2016.01)
*H02P 27/08* (2006.01)
(Continued)

(52) U.S. Cl.
CPC .............. *H02P 27/08* (2013.01); *H02M 1/00* (2013.01); *H02M 7/5395* (2013.01); *H02P 27/085* (2013.01); *H02M 2001/0009* (2013.01)

(58) Field of Classification Search
CPC .......... H02P 27/04; H02P 27/06; H02P 21/00; H02P 6/00; H02P 7/06; H02M 3/335;
(Continued)

(56) References Cited

U.S. PATENT DOCUMENTS 8,598,821 B2 12/2013 Aiba et al.
9,059,657 B2 * 6/2015 Maekawa ............. H02P 27/085
(Continued)

FOREIGN PATENT DOCUMENTS

JP 2005-229676 A 8/2005
JP 2006-296178 A 10/2006
(Continued)

*Primary Examiner* — Antony M Paul
(74) *Attorney, Agent, or Firm* — Birch, Stewart, Kolasch & Birch, LLP

(57) ABSTRACT

In an inverter control apparatus, a phase current calculation section calculates each of phase currents flowing into a motor by using measurement results of a current sensor, and a voltage command generation section calculates three-phase voltage commands by using each of the estimated phase currents. A command modulation section compares the phase voltage commands with each other, to specify a full-on phase or a full-off phase on the basis of the comparison result and then to set the voltage command of the specified phase to a full-on voltage or a full-off voltage, and offsets the voltage commands of the other two phases according to the full-on voltage or the full-off voltage to modulate the voltage commands into voltage commands allowing the line voltage between the other two phases to be kept constant. A PWM signal generation section generates PWM signals by comparing, according to a predetermined rule set in advance, three carrier waves generated by a
(Continued)

carrier wave generation section with each of the phase voltage commands modulated by the command modulation section. Accordingly, each of the phase currents can be calculated from a DC input current, so that the efficiency can be improved.

9 Claims, 16 Drawing Sheets

(51) Int. Cl.
  *H02M 1/00* (2006.01)
  *H02M 7/5395* (2006.01)
(58) Field of Classification Search
  CPC ............ H02M 1/12; H02M 1/14; H02M 3/24; H02M 7/44
  USPC ............ 318/400.01, 400.02, 400.06, 400.07, 318/400.14, 400.15, 700, 701, 721, 779, 318/799, 800, 801, 599, 811, 430, 432, 318/437; 363/21.1, 40, 44, 95, 120, 175; 388/800, 804, 829
  See application file for complete search history.

(56) References Cited

U.S. PATENT DOCUMENTS

| | | |
|---|---|---|
| 2005/0194925 A1 | 9/2005 | Ito et al. |
| 2008/0273360 A1 | 11/2008 | Goto |

FOREIGN PATENT DOCUMENTS

| | | |
|---|---|---|
| JP | 2008-220117 A | 9/2008 |
| WO | WO 2010/095445 A1 | 8/2010 |

\* cited by examiner

FIG. 9

| CASE | ROTOR POSITION (ELECTRICAL ANGLE) | MAXIMUM PHASE | INTERMEDIATE PHASE | MINIMUM PHASE |
|---|---|---|---|---|
| 1 | 0~30deg | W PHASE | U PHASE | V PHASE (OFF) |
| 2 | 30~60deg | U PHASE | W PHASE | V PHASE (OFF) |
| 3 | 60~90deg | U PHASE (ON) | W PHASE | V PHASE |
| 4 | 90~120deg | U PHASE (ON) | V PHASE | W PHASE |
| 5 | 120~150deg | U PHASE | V PHASE | W PHASE (OFF) |
| 6 | 150~180deg | V PHASE | U PHASE | W PHASE (OFF) |
| 7 | 180~210deg | V PHASE (ON) | U PHASE | W PHASE |
| 8 | 210~240deg | V PHASE (ON) | W PHASE | U PHASE |
| 9 | 240~270deg | V PHASE | W PHASE | U PHASE (OFF) |
| 10 | 270~300deg | W PHASE | V PHASE | U PHASE (OFF) |
| 11 | 300~330deg | W PHASE (ON) | V PHASE | U PHASE |
| 12 | 330~360deg | W PHASE (ON) | U PHASE | V PHASE |

FIG. 12

| CASE | ROTOR POSITION (ELECTRICAL ANGLE) | MAXIMUM PHASE | INTERMEDIATE PHASE | MINIMUM PHASE |
|---|---|---|---|---|
| 1 | 0~30deg | W PHASE (ON) | U PHASE | V PHASE |
| 2 | 30~60deg | U PHASE (ON) | W PHASE | V PHASE |
| 3 | 60~90deg | U PHASE (ON) | W PHASE | V PHASE |
| 4 | 90~120deg | U PHASE (ON) | V PHASE | W PHASE |
| 5 | 120~150deg | U PHASE | V PHASE | W PHASE (OFF) |
| 6 | 150~180deg | V PHASE | U PHASE | W PHASE (OFF) |
| 7 | 180~210deg | V PHASE | U PHASE | W PHASE (OFF) |
| 8 | 210~240deg | V PHASE | W PHASE | U PHASE (OFF) |
| 9 | 240~270deg | V PHASE | W PHASE | U PHASE (OFF) |
| 10 | 270~300deg | W PHASE | V PHASE | U PHASE (OFF) |
| 11 | 300~330deg | W PHASE (ON) | V PHASE | U PHASE |
| 12 | 330~360deg | W PHASE (ON) | U PHASE | V PHASE |

FIG. 14

| CASE | ROTOR POSITION (ELECTRICAL ANGLE) | MAXIMUM PHASE | INTERMEDIATE PHASE | MINIMUM PHASE |
|---|---|---|---|---|
| 1 | 0~30deg | W PHASE (ON) | U PHASE | V PHASE |
| 2 | 30~60deg | U PHASE (ON) | W PHASE | V PHASE |
| 3 | 60~90deg | U PHASE (ON) | W PHASE | V PHASE |
| 4 | 90~120deg | U PHASE (ON) | V PHASE | W PHASE |
| 5 | 120~150deg | U PHASE (ON) | V PHASE | W PHASE |
| 6 | 150~180deg | V PHASE (ON) | U PHASE | W PHASE |
| 7 | 180~210deg | V PHASE (ON) | U PHASE | W PHASE |
| 8 | 210~240deg | V PHASE (ON) | W PHASE | U PHASE |
| 9 | 240~270deg | V PHASE (ON) | W PHASE | U PHASE |
| 10 | 270~300deg | W PHASE (ON) | V PHASE | U PHASE |
| 11 | 300~330deg | W PHASE (ON) | V PHASE | U PHASE |
| 12 | 330~360deg | W PHASE (ON) | U PHASE | V PHASE |

FIG. 16

| CASE | ROTOR POSITION (ELECTRICAL ANGLE) | MAXIMUM PHASE | INTERMEDIATE PHASE | MINIMUM PHASE |
|---|---|---|---|---|
| 1 | 0～30deg | W PHASE | U PHASE | V PHASE (OFF) |
| 2 | 30～60deg | U PHASE | W PHASE | V PHASE (OFF) |
| 3 | 60～90deg | U PHASE | W PHASE | V PHASE (OFF) |
| 4 | 90～120deg | U PHASE | V PHASE | W PHASE (OFF) |
| 5 | 120～150deg | U PHASE | V PHASE | W PHASE (OFF) |
| 6 | 150～180deg | V PHASE | U PHASE | W PHASE (OFF) |
| 7 | 180～210deg | V PHASE | U PHASE | W PHASE (OFF) |
| 8 | 210～240deg | V PHASE | W PHASE | U PHASE (OFF) |
| 9 | 240～270deg | V PHASE | W PHASE | U PHASE (OFF) |
| 10 | 270～300deg | W PHASE | V PHASE | U PHASE (OFF) |
| 11 | 300～330deg | W PHASE | V PHASE | U PHASE (OFF) |
| 12 | 330～360deg | W PHASE | U PHASE | V PHASE (OFF) |

INVERTER CONTROL APPARATUS AND INVERTER APPARATUS

TECHNICAL FIELD

The present invention relates to an inverter control apparatus and an inverter apparatus provided with the inverter control apparatus.

BACKGROUND ART

Conventionally, there is known a method in which, when an AC motor is driven by an inverter, each phase current of the AC motor is detected from a DC input current of the inverter (see, for example, PTL 1 and PTL 2). In PTL 1 and PTL 2, it is disclosed that three carrier waves, each pair of which has a fixed phase difference, are generated, and PWM signals are generated by comparing the carrier waves with phase voltage commands. When the three carrier waves are used in this way, each phase current can be surely detected, since this way can prevent the rising edges of the PWM signals of respective phases from being close to each other and the pulse width for current detection from being reduced.

CITATION LIST

Patent Literature

{PTL 1}
Japanese Unexamined Patent Application, Publication No. 2008-220117
{PTL 2}
PCT International Publication No. WO 2010/095445

SUMMARY OF INVENTION

Technical Problem

With the inverter described in PTL 1 and PTL 2, each phase current can be acquired from a DC input current, but it is difficult to realize high efficiency of the inverter.

The present invention has been made in view of the above-described circumstances. An object of the present invention is to provide an inverter control apparatus capable of calculating each phase current from a DC input current and realizing high efficiency, and is to provide an inverter apparatus provided with the inverter control apparatus.

Solution to Problem

A first aspect of the present invention provides an inverter control apparatus applied to an inverter apparatus including an inverter which converts a DC voltage into an AC voltage and outputs the AC voltage to an AC motor, and a current sensor which measures a DC current on the input side of the inverter, the inverter control apparatus including: a phase current calculation section which calculates each of phase currents flowing into the AC motor by using the measurement results of the current sensor; a voltage command calculation section which calculates three-phase voltage commands supplied to the AC motor by using the phase currents calculated by the phase current calculation section; a command modulation section which compares the phase voltage commands generated by the voltage command calculation section with each other, specifies a full-on phase or a full-off phase on the basis of the comparison results, sets the voltage command of the specified phase to a full-on voltage corresponding to duty 100% or a full-off voltage corresponding to duty 0%, offsets the voltage commands of the other two phases according to the full-on voltage or the full-off voltage, and modulates voltage commands so as to allow the line voltage between the other two phases to be kept constant; a carrier wave generation section which generates a first carrier wave as a reference, a second carrier wave delayed from the first carrier wave by a fixed time, and a third carrier wave advanced from the first carrier wave by the fixed time; and a PWM signal generation section which generates PWM signals by comparing, according to a predetermined rule set in advance, each of the phase voltage commands modulated by the command modulation section with the three carrier waves generated by the carrier wave generation section.

With the inverter control apparatus according to the first aspect, one of the three-phase voltage commands is set to the full-on voltage or the full-off voltage, and hence the switching loss can be reduced. Further, the PWM signals are generated by comparing the three carrier waves with each of the phase voltage commands. Thus, as described in PCT International Publication No. WO 2010/095445, the current detection period longer than a fixed time period can be secured, so that the phase current detection can be stably performed.

In the inverter control apparatus described above, the command modulation section may specify, among the three-phase voltage commands, the voltage command having a minimum voltage value as the voltage command of the phase to be full off, and may always set the voltage command of the specified phase to the full-off voltage. Alternatively, in the inverter control apparatus described above, the command modulation section may specify, among the three-phase voltage commands, the voltage command having a maximum voltage value as the voltage command of the phase to be full on, and may always set the voltage command of the specified phase to the full-on voltage.

With the inverter control apparatus described above, the fluctuation of the neutral point, which is caused by frequent switching between the full-on voltage corresponding to duty 100% and the full-off voltage corresponding to duty 0%, can be suppressed, and the occurrence of ripples can be suppressed.

In the inverter control apparatus described above, the command modulation section may perform, at a predetermined frequency, switching between periods during which, among the three-phase voltage commands, the voltage command having the minimum voltage value and the voltage command having the maximum voltage value are respectively specified as the voltage value of the phase to be full off and the voltage value of the phase to be full on. In this case, it is preferred that the predetermined frequency is set to be lower than the frequency of the carrier wave. For example, it is preferred that the predetermined frequency is set to be not more than $\frac{1}{100}$ times the frequency of the carrier wave.

In the inverter control apparatus described above, the switching between the periods, during which, among the three-phase voltage commands, the voltage command having the minimum voltage value and the voltage command having the maximum voltage value are respectively specified as the full-off phase and the full-on phase, is performed at the predetermined frequency. As compared with the case where the voltage command is always set to the full-off voltage or the full-on voltage, the upper and lower arms in the inverter can be used in a well-balanced manner.

In the inverter control apparatus described above, it is preferred that the PWM signal generation section generates the PWM signals by comparing one of the voltage commands of the other two phases with the first carrier wave.

In the inverter control apparatus described above, as a combination of the carrier waves compared with the voltage commands of the other two phases, it is possible to use a combination of the first carrier wave and the second carrier wave, or a combination of the first carrier wave and the third carrier wave. This can reduce useless power consumption.

A second aspect of the present invention provides an inverter apparatus provided with the inverter control apparatus described above.

A third aspect of the present invention provides a vehicle-mounted air conditioner provided with an electric compressor using the inverter apparatus described above.

A fourth aspect of the present invention provides an inverter control method applied to an inverter apparatus including an inverter which converts a DC voltage into an AC voltage and outputs the AC voltage to an AC motor, and a current sensor which measures a DC current on the input side of the inverter, the inverter control method including: a phase current calculation step of calculating each of phase currents flowing into the AC motor by using the measurement results of the current sensor; a voltage command calculation step of calculating three-phase voltage commands supplied to the AC motor by using the phase currents calculated in the phase current calculation step; a command modulation step of mutually comparing the phase voltage commands generated in the voltage command calculation step, to specify a full-on phase or a full-off phase on the basis of the comparison result and then to set the voltage command of the specified phase to a full-on voltage corresponding to duty 100% or a full-off voltage corresponding to duty 0%, and offsetting the voltage commands of the other two phases according to the full-on voltage or the full-off voltage to modulate the voltage commands into voltage commands allowing the line voltage between the other two phases to be kept constant; a carrier wave generation step of generating a first carrier wave as a reference, a second carrier wave delayed from the first carrier wave by a fixed time, and a third carrier wave advanced from the first carrier wave by the fixed time; and a PWM signal generation step of generating PWM signals by comparing, according to a predetermined rule set in advance, each of the phase voltage commands modulated in the command modulation step with the three carrier waves generated in the carrier wave generation step.

A fifth aspect of the present invention provides an inverter control program applied to an inverter apparatus including an inverter which converts a DC voltage into an AC voltage and outputs the AC voltage to an AC motor, and a current sensor which measures a DC current on the input side of the inverter, the inverter control program making a computer execute: a phase current calculation process of calculating each of phase currents flowing into the AC motor by using the measurement results of the current sensor; a voltage command calculation process of calculating three-phase voltage commands supplied to the AC motor by using the phase currents calculated in the phase current calculation process; a command modulation process of mutually comparing the phase voltage commands generated in the voltage command calculation process, to specify a full-on phase or a full-off phase on the basis of the comparison result and then to set the voltage command of the specified phase to a full-on voltage corresponding to duty 100% or a full-off voltage corresponding to duty 0%, and offsetting the voltage commands of the other two phases according to the full-on voltage or the full-off voltage to modulate the voltage commands into voltage commands allowing the line voltage between the other two phases to be kept constant; a carrier wave generation process of generating a first carrier wave as a reference, a second carrier wave delayed from the first carrier wave by a fixed time, and a third carrier wave advanced from the first carrier wave by the fixed time; and a PWM signal generation process of generating PWM signals by comparing, according to a predetermined rule set in advance, each of the phase voltage commands modulated in the command modulation process with the three carrier waves generated in the carrier wave generation process.

Advantageous Effects of Invention

With the present invention, three phase currents can be detected by measuring a DC input current, and the effect of improving the efficiency can be obtained.

BRIEF DESCRIPTION OF DRAWINGS

FIG. 9 is a view showing a relationship between the modulated three-phase voltage commands shown in FIG. 8 and the rotor position.

FIG. 12 is a view showing a relationship between the modulated three-phase voltage commands shown in FIG. 11 and the rotor position.

FIG. 14 is a view showing a relationship between the modulated three-phase voltage commands shown in FIG. 13 and the rotor position.

FIG. 16 is a view showing a relationship between the modulated three-phase voltage commands shown in FIG. 15 and the rotor position.

DESCRIPTION OF EMBODIMENTS

In the following, each of embodiments, in the case where an inverter control apparatus according to the present invention and an inverter apparatus provided with the inverter control apparatus are applied to an electric compressor used in an on-vehicle air conditioner, will be described with reference to the accompanying drawings. The inverter control apparatus and the inverter apparatus according to the present invention are not limited to the application to the electric compressor described below and can be widely applied to motors in general.

First Embodiment

Figure 1:
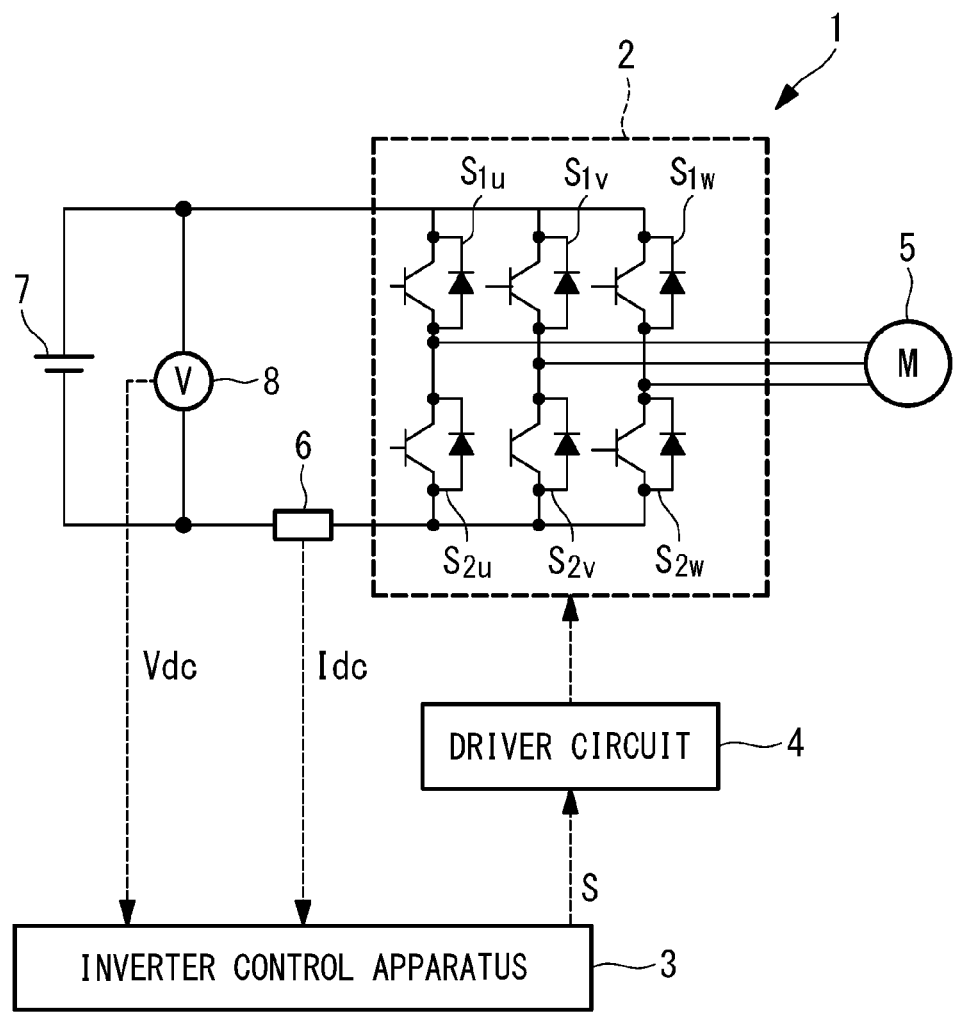
FIG. 1 is a view showing a schematic configuration of an inverter apparatus according to a first embodiment of the present invention.

FIG. 1 is a view showing a schematic configuration of an inverter apparatus according to a first embodiment of the present invention. As shown in FIG. 1, an inverter apparatus 1 includes: an inverter 2 which converts a DC voltage Vdc from a DC power supply 7 into three phase AC voltages and outputs the three phase AC voltages to a motor 5 of an electric compressor; an inverter control apparatus 3 which controls the inverter 2; and a driver circuit 4 which drives the inverter 2 on the basis of PWM signals supplied from the inverter control apparatus 3.

The inverter 2 includes switching elements $S_{1u}$, $S_{1v}$ and $S_{1w}$ provided on the upper arm and respectively corresponding to the phases, and switching elements $S_{2U}$, $S_{2V}$ and $S_{2W}$ provided on the lower arm and respectively corresponding to the phases. In the inverter 2, the switching elements are driven by the driver circuit 4 on the basis of the PWM signals from the inverter control apparatus 3, to generate three phase AC voltages supplied to the motor 5.

Further, the inverter apparatus 1 includes a current sensor 6 which detects a DC current (DC input current) Idc on the input side of the inverter 2, and a voltage sensor 8 which detects input of a DC voltage Vdc of the inverter 2.

The DC current Idc detected by the current sensor 6, and the DC voltage Vdc detected by the voltage sensor 8 are inputted into the inverter control apparatus 3. Here, examples of the current sensor 6 include a shunt resistor. In FIG. 1, the current sensor 6 is provided on the negative electrode side of the DC power supply 7, but may be provided on the positive electrode side of the DC power supply 7.

The inverter control apparatus 3 is, for example, an MPU (Micro Processing Unit), and includes a computer-readable recording medium on which a program for executing each of processes described below is recorded. A CPU reads each of the programs recorded on the recording medium to a main storage device, such as a RAM, and executes the program, so that each process described below is realized. Examples of the computer-readable recording medium include a magnetic disk, a magneto-optical disk, a semiconductor memory, and the like.

The inverter control apparatus 3 generates PWM signals S for respective phases so that the rotation speed of the motor 5 is made to coincide with a motor speed command supplied from an upper-level control apparatus (not shown), and outputs the generated PWM signals S to the driver circuit 4. The driver circuit 4 drives the inverter 2 by supplying a drive voltage based on each of the PWM signals S to the switching element corresponding to each phase of the inverter 2, so that desired three phase AC voltages are supplied to the motor 5.

Figure 2:
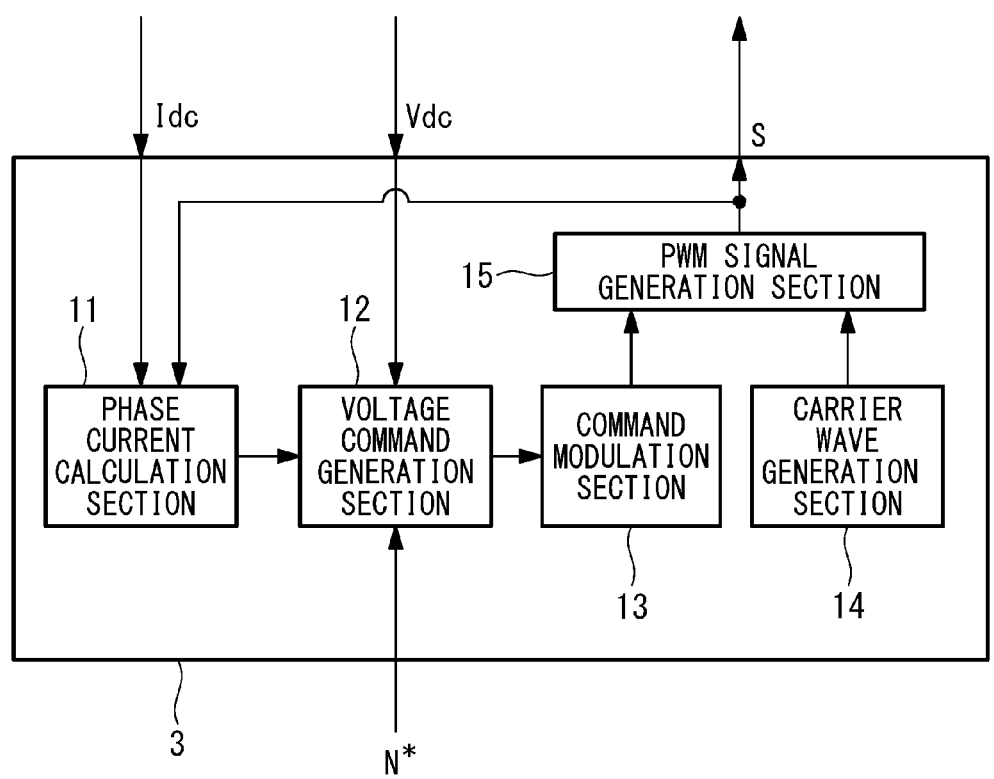
FIG. 2 is a functional block diagram of an inverter control apparatus according to the first embodiment of the present invention.

FIG. 2 shows functional blocks respectively corresponding to the functions provided in the inverter control apparatus 3.

As shown in FIG. 2, the inverter control apparatus 3 includes a phase current calculation section 11, a voltage command generation section 12, a command modulation section 13, a carrier wave generation section 14, and a PWM signal generation section 15.

The phase current calculation section 11 respectively calculates U, V, W phase currents by using the DC current Idc detected by the current sensor 6 and the PWM signals S supplied from the PWM signal generation section 15 to the inverter 2. The method for calculating each phase current from the DC current Idc is known, and detailed description thereof is omitted here.

The voltage command generation section 12 generates three-phase voltage commands by using the DC voltage Vdc measured by the voltage sensor 8, each of the phase currents calculated by the phase current calculation section 11, a rotation number command N* supplied from an upper-level control unit (not shown), and the like, so as to make the rotation number of the motor 5 coincide with the rotation number command N*. As the technique for generating the three-phase voltage commands, a known technique may be suitably adopted and used. Examples of the technique for generating the three-phase voltage commands include V/f constant control, vector control, and the like.

The command modulation section 13 two-phase modulates the three-phase voltage commands generated by the voltage command generation section 12. For example, the command modulation section 13 compares the values of three-phase voltage commands at each time with each other. Then, according to a predetermined algorithm, the command modulation section 13 sets one of the phase voltage commands to a full-on voltage (voltage corresponding to duty 100%) or a full-off voltage (voltage corresponding to duty 0%) on the basis of the comparison results, and offsets the voltage commands of the other two phases according to the full-on voltage or the full-off voltage, and adjusts the offset phase voltage commands so that the line voltage between the other two phases is kept constant.

For example, the command modulation section 13 extracts the maximum value and the minimum value of the three-phase voltage commands, and calculates the difference between the maximum value and the full-on voltage and the difference between the minimum value and the full-off voltage. Then, the command modulation section 13 selects the phase corresponding to the smaller difference so that the voltage command of the selected phase is set to the full-on voltage or the full-off voltage. In the present embodiment, the full-on phase or the full-off phase is determined according to the above-described algorithm, but the algorithm is not restricted to this example. For example, in such a manner that the phase corresponding to the maximum value is always full on, or the phase corresponding to the minimum value is always full off, the algorithm for determining the phase to be full on or full off may be created according to control purpose.

Figure 3:
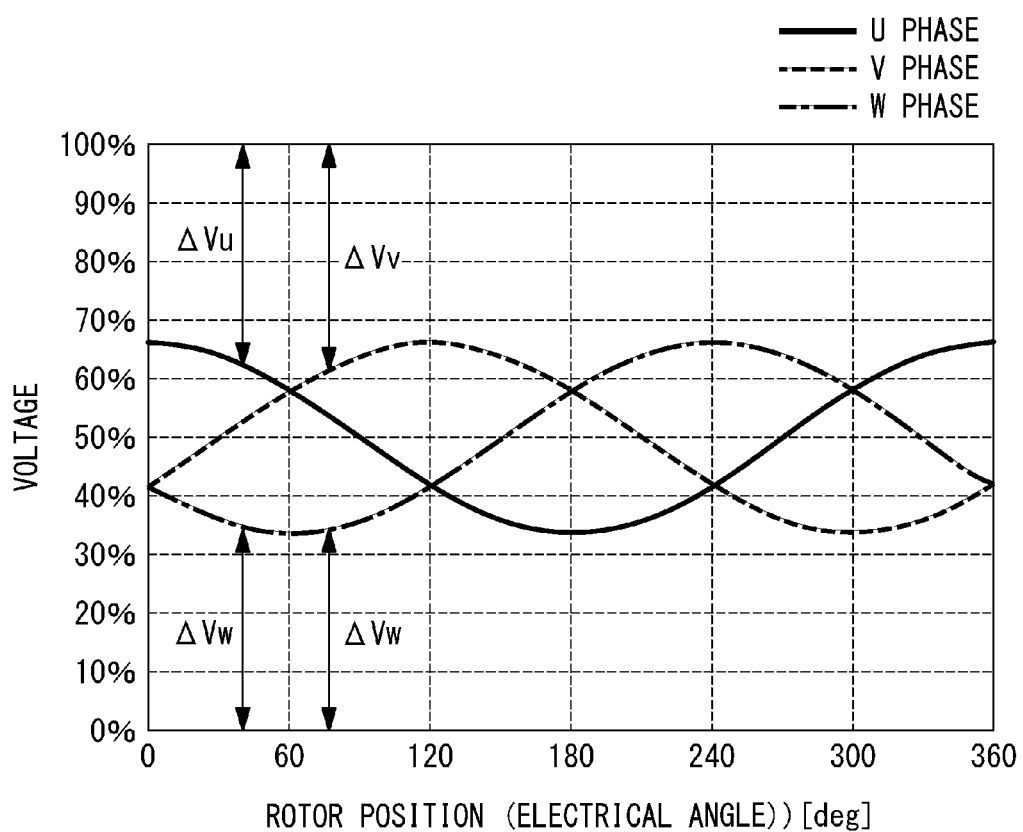
FIG. 3 is a view showing an example of three-phase voltage commands generated by a voltage command generation section.
Figure 4:
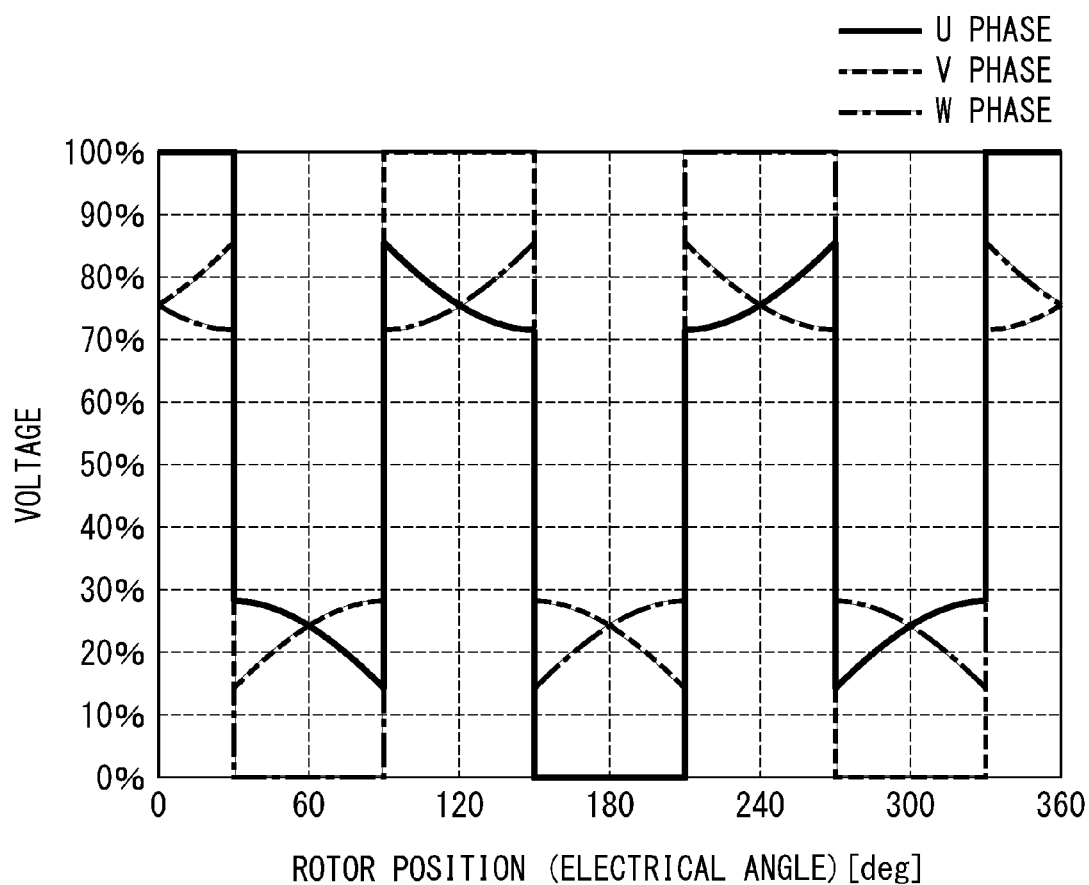
FIG. 4 is a view showing three-phase voltage commands after the three-phase voltage commands shown in FIG. 3 are modulated by a command modulation section.

For example, when three-phase voltage commands are generated as show in FIG. 3, the difference $\Delta V_W$ between the value of the W-phase voltage command and the full-off voltage is smaller than the difference $\Delta V_U$ between the value of the U-phase voltage command and the full-on voltage in the range where the rotor position (electrical angle) is between 30 (deg) and 60 (deg). In the range where the rotor position is between 60 (deg) and 90 (deg), the difference $\Delta V_W$ between the value of the W-phase voltage command and the full-off voltage is smaller than the difference $\Delta V_V$ between the value of the V-phase voltage command and the full-on voltage. Therefore, as shown in FIG. 4, in the range where the rotor position is between 30 (deg) and 90 (deg), the W-phase voltage command is set to the full-off voltage, and the voltage commands of the other two phases are offset according to the full-off voltage so that the line voltage between the two phase voltage commands is kept constant. Accordingly, the three-phase voltage commands shown in FIG. 3 are modulated into three-phase voltage commands as shown in FIG. 4 by the command modulation section 13.

Figure 5:
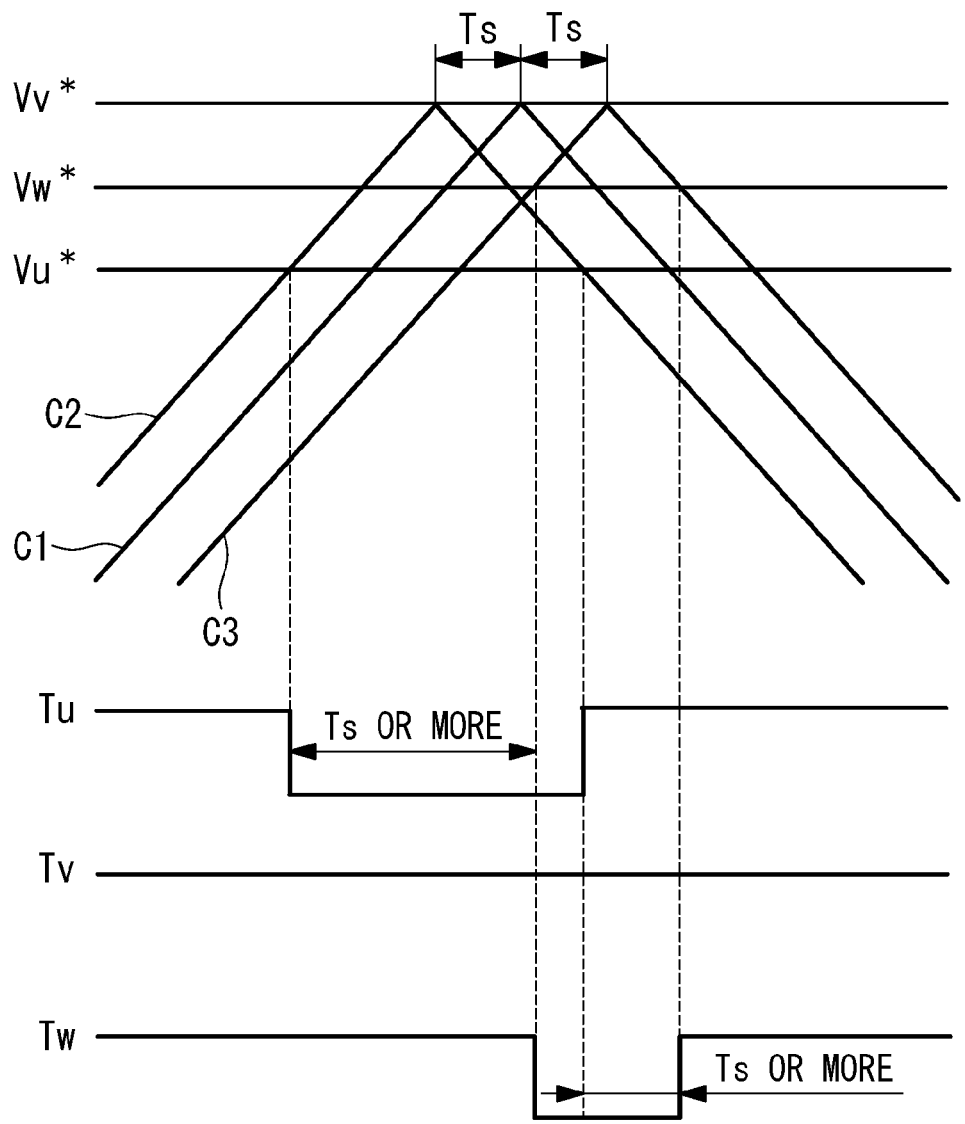
FIG. 5 is a view for explaining PWM signals generated by a PWM signal generation section according to the first embodiment of the present invention.

The carrier wave generation section 14 generates three carrier waves C1, C2 and C3 so that the interval between the adjacent carrier waves is set to a fixed time period $T_s$ as shown in FIG. 5. For example, the carrier wave generation section 14 generates the first carrier wave C1 as a reference, and then generates the second carrier wave C2 delayed from the first carrier wave C1 by a fixed time, and the third carrier wave advanced from the first carrier wave C1 by the fixed time. The details of FIG. 5 will be described below.

The PWM signal generation section 15 generates PWM signals S by comparing, according to a predetermined rule, the three-phase voltage commands modulated by the command modulation section 13 with the three carrier waves generated by the carrier wave generation section 14. Specifically, when one of the three-phase voltage commands is set to the full-on voltage, the PWM signal generation section 15 generates PWM signals S by comparing the minimum voltage of the voltage commands with the second carrier wave C2, and by comparing the intermediate value of the voltage commands with the third carrier wave C3. In this case, the duty of the phase set to the full-on voltage is 100%.

FIG. 5 is an enlarged view of the carrier wave waveforms for one period. Although the three-phase voltage commands are changed according to the rotor positions as shown in FIG. 4, the three-phase voltage command corresponding to one period of the carrier wave can be regarded as a DC voltage value, and hence, in FIG. 5, each of the phase voltage commands is expressed as one value (straight line). In the following, the phase voltage commands are expressed similarly.

FIG. 5 is a view showing an example when the V-phase voltage command $V_V^*$ is set to the full-on voltage, the W-phase voltage command is set to the intermediate value, and the U-phase voltage command is set to the minimum value. This case corresponds to, for example, the case where the rotor position is in the range between 120 (deg) and 150 (deg) shown in FIG. 4. In this case, the PWM signal generation section 15 generates PWM signals S as shown in the lower portion of FIG. 5 by comparing the second carrier wave C2 with the U-phase voltage command $V_U^*$ having the minimum value and by comparing the third carrier wave C3 with the W-phase voltage command $V_W^*$ having the intermediate value. The duty of the V phase set to the full-on voltage is 100%.

When one of the three-phase voltage commands is set to the full-off voltage, the PWM signal generation section 15 generates PWM signals S by comparing the maximum value of the voltage commands with the second carrier wave C2, and by comparing the intermediate value of the voltage commands with the third carrier wave C3. In this case, the duty of the phase set to the full-off voltage is 0%.

Figure 6:
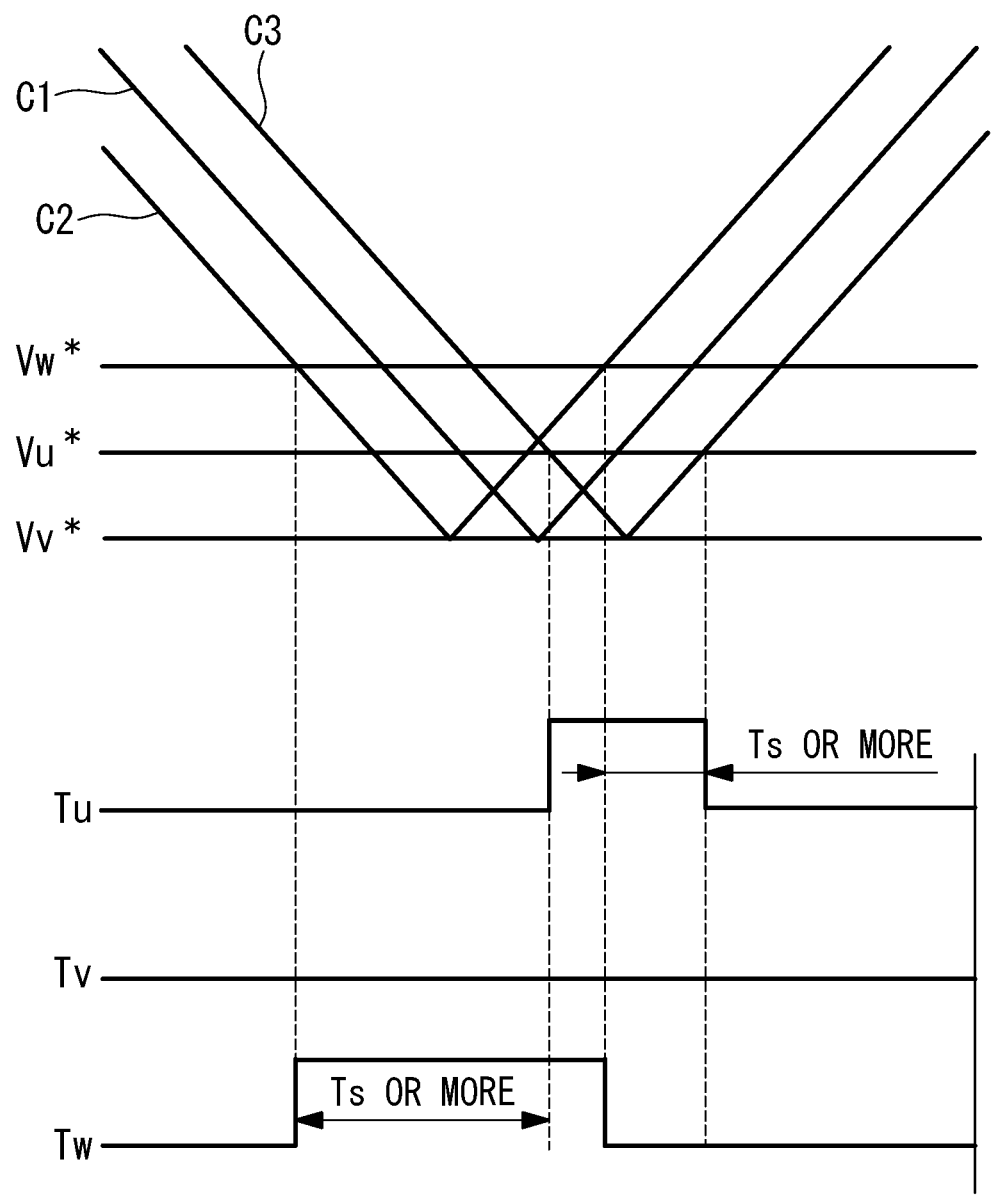
FIG. 6 is a view for explaining the PWM signals generated by the PWM signal generation section according to the first embodiment of the present invention.

FIG. 6 is a view showing an example when the V-phase voltage command $V_V^*$ is set to the full-off voltage, the U-phase voltage command $V_U^*$ is set to the intermediate value, and the W-phase voltage command $V_W^*$ is set to the maximum value. This case corresponds to, for example, the case where the rotor position is in the range between 270 (deg) and 300 (deg).

As shown in FIG. 6, the PWM signal generation section 15 generates PWM signals S as shown in the lower portion of FIG. 6 by comparing the second carrier wave C2 with the W-phase voltage command $V_W^*$ having the maximum value and by comparing the third carrier wave C3 with the U-phase voltage command $V_U^*$ having the intermediate value. The duty of the V phase set to the full-off voltage is 0%.

In each of the cases shown in FIG. 5 and FIG. 6, a time period not less than the fixed time period $T_s$ can be secured as the period in which the current of only one phase flows as the DC current Idc, that is, can be secured as the current detection period. Accordingly, each of the phase currents can be surely detected.

Next, the operation of the inverter control apparatus 3 and the inverter apparatus 1, which are configured as described above, will be described.

In the inverter apparatus 1, the DC current Idc and the DC voltage Vdc are respectively detected by the current sensor 6 and the voltage sensor 8, and the detection results are outputted to the inverter control apparatus 3. In the inverter control apparatus 3, the phase current calculation section 11 calculates each phase current with each of the PWM signals S and the DC current Idc, and outputs the calculated phase currents to the voltage command generation section 12. By using the DC voltage Vdc measured by the voltage sensor 8, the respective phase currents, the rotation number command N* supplied from the upper-level control apparatus (not shown), and the like, the voltage command generation section 12 generates respective phase voltage commands for making the rotation number of the motor 5 coincide with the rotation number command N*, and outputs the phase voltage commands to the command modulation section 13.

In the command modulation section 13, the three-phase voltage commands generated by the voltage command generation section 12 are two-phase modulated. Specifically, in the command modulation section 13, the values of three-phase voltage commands at each time are compared with each time, so that one of the phase voltage commands is set to the full-on voltage or the full-off voltage. The other two phase voltage commands are offset according to the full-on voltage or the full-off voltage and adjusted so that the line voltage between the other two phases is kept constant. The phase voltage commands respectively modulated by the command modulation section 13 are outputted to the PWM signal generation section 15.

The PWM signal generation section 15 generates PWM signals S by respectively comparing the phase voltage commands inputted from the command modulation section 13 with three carrier waves C1, C2 and C3 which are generated by the carrier wave generation section 14 so that the interval between the adjacent carrier waves is set to the fixed time period $T_s$.

The PWM signals S generated by the PWM signal generation section 15 in this way are outputted to the driver circuit 4. On the basis of each of the PWM signals for three phases, the driver circuit 4 supplies drive voltages to the switching elements corresponding to the phases of the arms, and thereby controls the inverter 2. Accordingly, a voltage according to each of the phase voltage commands is supplied to the motor 5, so that the rotation number of the motor 5 is controlled.

Figure 7:
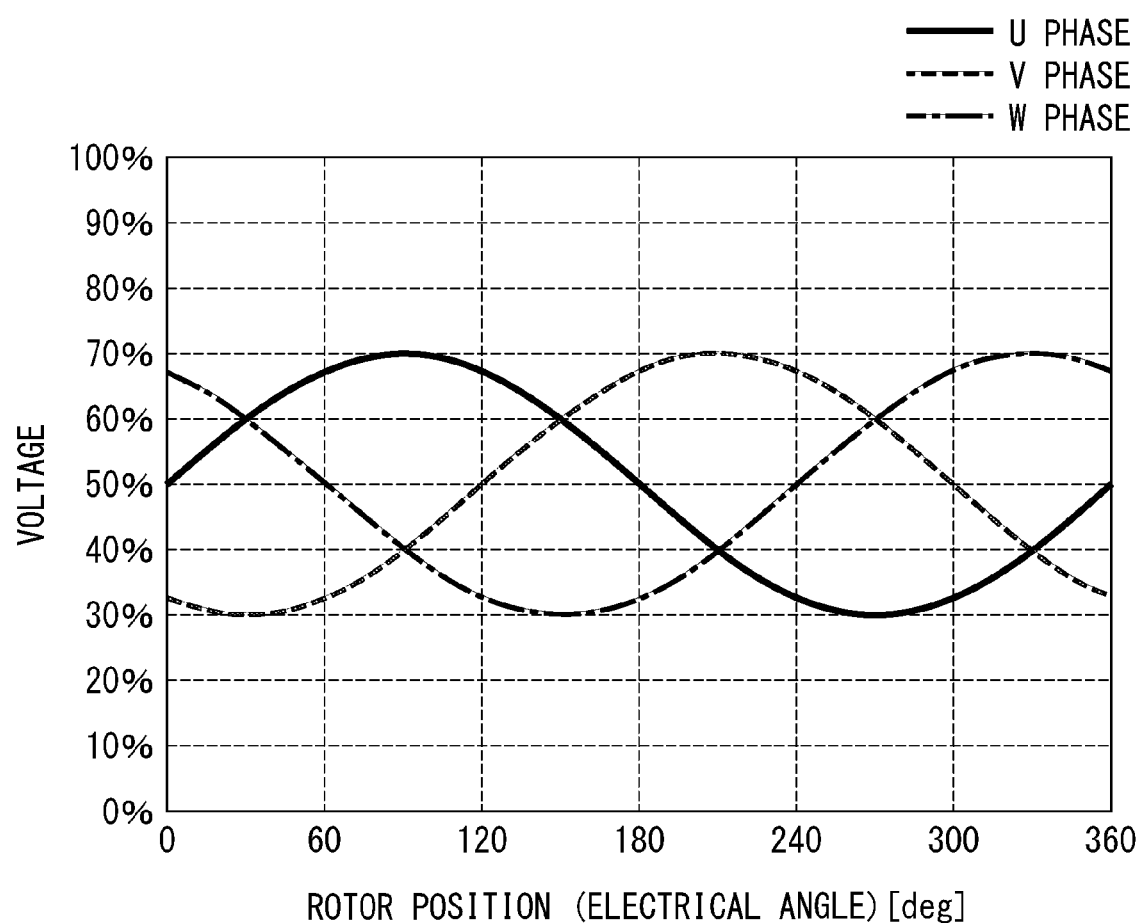
FIG. 7 is a view showing an example of three-phase voltage commands generated by the voltage command generation section according to the first embodiment of the present invention.
Figure 8:
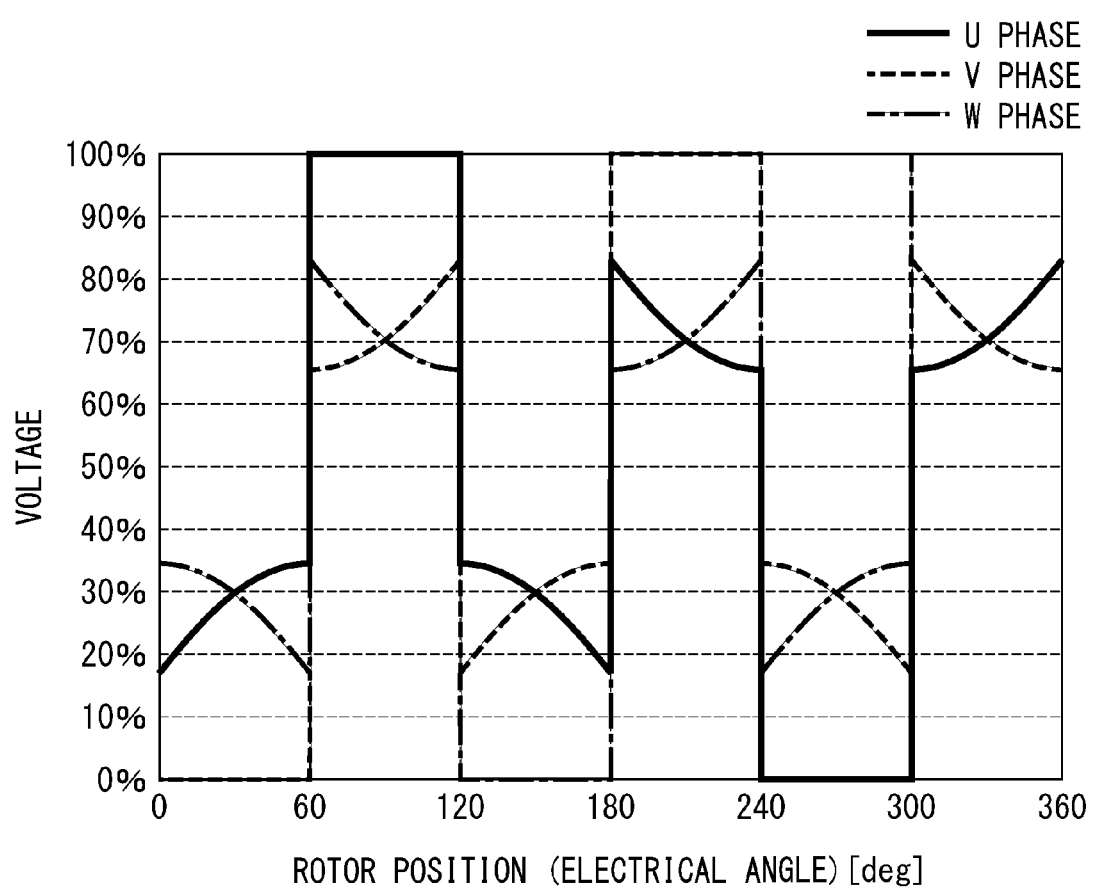
FIG. 8 is a view showing modulated three-phase voltage commands generated on the basis of the three-phase voltage commands shown in FIG. 7 in the inverter control apparatus according to the first embodiment of the present invention.

FIG. 7 shows an example of the three-phase voltage commands generated by the voltage command generation section 12, and FIG. 8 shows modulated three-phase voltage commands generated on the basis of the three-phase voltage commands shown in FIG. 7. FIG. 9 is a view showing a relationship between each of the phase voltage commands shown in FIG. 8 and the rotor position. In FIG. 9, "(OFF)" shows the full-off voltage, that is, the state where the duty is 0(%), and "(ON)" shows the full-on voltage, that is, the state where the duty is 100%.

As described above, with the inverter control apparatus 3 and the inverter apparatus 1 according to the present embodiment, the current detection period not less than the time period of $T_s$ can be secured as shown in FIG. 5 and FIG. 6. Also, when the two-phase modulation method is adopted, the switching of one of the three phases is stopped, so that the switching loss can be reduced, and the efficiency of the inverter apparatus 1 can be improved.

Second Embodiment

Next, an inverter control apparatus and an inverter apparatus according to a second embodiment of the present invention will be described with reference to the accompanying drawings. In the inverter control apparatus and the inverter apparatus according to the second embodiment, the process, in which the PWM signals are generated by the PWM signal generation section, is different from that in the first embodiment described above.

Figure 10:
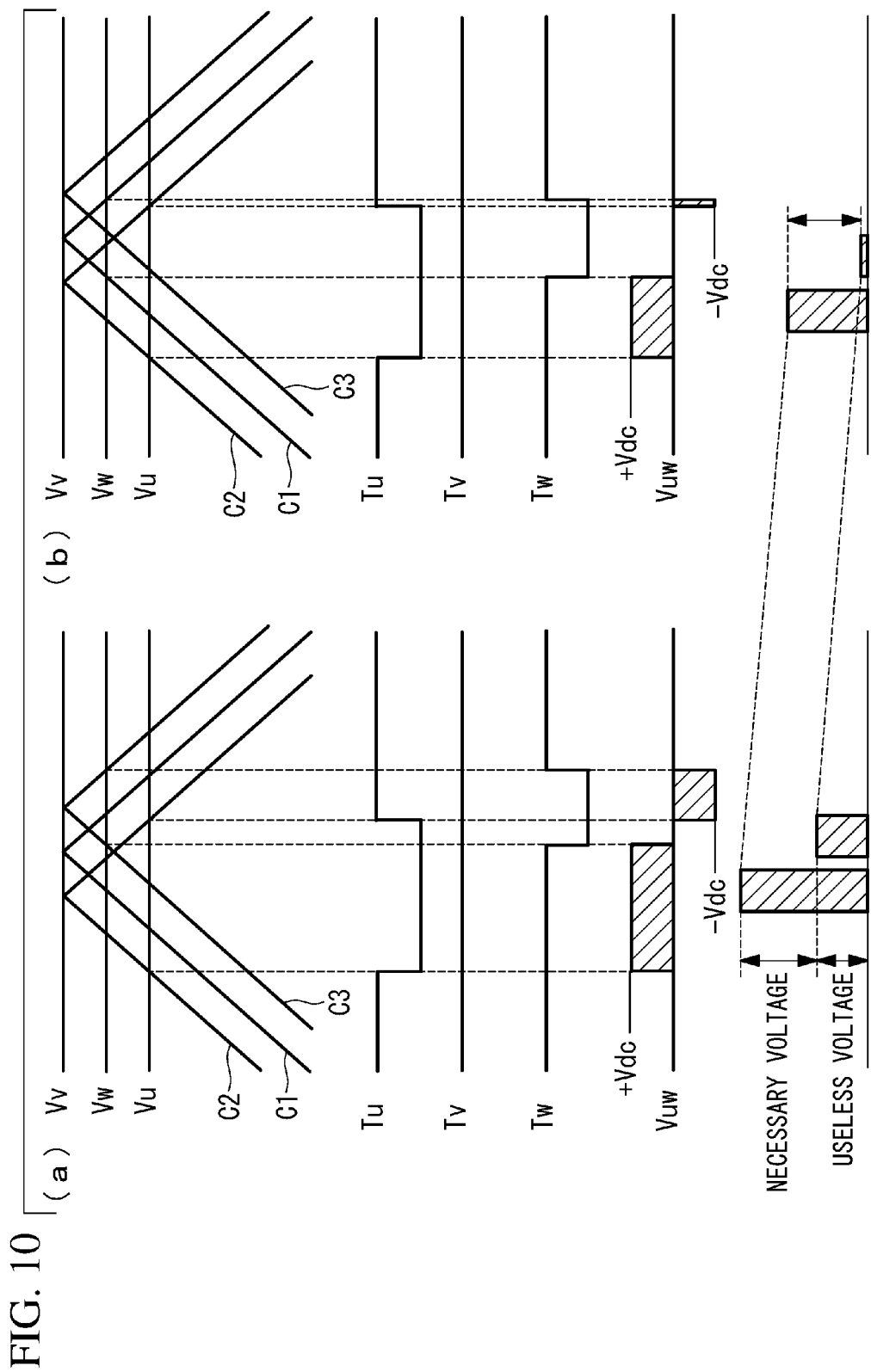
FIG. 10 is a view showing a comparison between the PWM signals generated by the PWM signal generation section according to the first embodiment of the present invention, and PWM signals generated by a PWM signal generation section according to a second embodiment.

Specifically, in the PWM signal generation section according to the present embodiment, the PWM signals for the other two phases, the phase voltage commands of which are not set to the full-on voltage or the full-off voltage, are generated by using the carrier waves having time difference of $T_s$, for example, by using the first carrier wave C1 and the second carrier wave C2, or by using the first carrier wave C1 and the third carrier wave C3. FIG. 10 is a view showing an example when the V-phase voltage command $V_V^*$ is set to the full-on voltage, and when the W-phase voltage command $V_W^*$ is set to the intermediate value, and the U-phase voltage command $V_U^*$ is set to the minimum value. FIG. 10(a) shows the PWM signals S generated by the inverter control apparatus 3 according to the first embodiment described above, and FIG. 10(b) shows the PWM signals generated by the inverter control apparatus according to the present embodiment.

As shown in FIG. 10(b), in the present embodiment, the PWM signals are generated by comparing the second carrier wave C2 with the U-phase voltage command $V_U^*$ having the minimum value, and by comparing the first carrier wave C1 with the W-phase voltage command $V_W^*$ having the intermediate value.

Therefore, each of FIG. 10(a) and FIG. 10(b) shows the UV line voltage $V_{UW}$ based on each of the PWM signals for the phases. As shown in the lowest portion of the each of FIG. 10(a) and FIG. 10(b), the present embodiment has an effect that the useless voltage in the PWM signals according to the second embodiment is smaller than the useless voltage in the PWM signals according to the first embodiment.

As described above, with the inverter control apparatus and the inverter apparatus according to the present embodiment, the PWM signals for the other two phases, the phase voltage commands of which are not set to the full-on voltage or the full-off voltage, are generated by using the carrier waves having the time difference of $T_s$, for example, by using the first carrier wave C1 and the second carrier wave C2, or by using the first carrier wave C1 and the third carrier wave C3. Therefore, as shown in FIG. 10(b), it is possible to avoid useless power consumption. Accordingly, harmonic components superimposed on the output currents of the inverter can be further reduced, and the efficiency of the inverter apparatus can be further improved.

However, in the inverter control based on the PWM signals according to the present embodiment, as can be seen from FIG. 10(b), when one of the other two phase voltage commands, which are not set to the full-on voltage or the full-off voltage, is close to the full-on voltage or the full-off voltage, it is difficult that the current detection period is sufficiently secured. Therefore, in such range of the rotor position, it may be configured such that the method according to the first embodiment described above is adopted, or such that the two-phase modulation is not performed, and PWM signals are generated by using the three-phase voltage commands generated by the voltage command generation section 12. In this case, the rotor positions, at which the methods for generating the PWM signals are switched, may be set beforehand so that the methods are switched according to the rotor positions.

Figure 11:
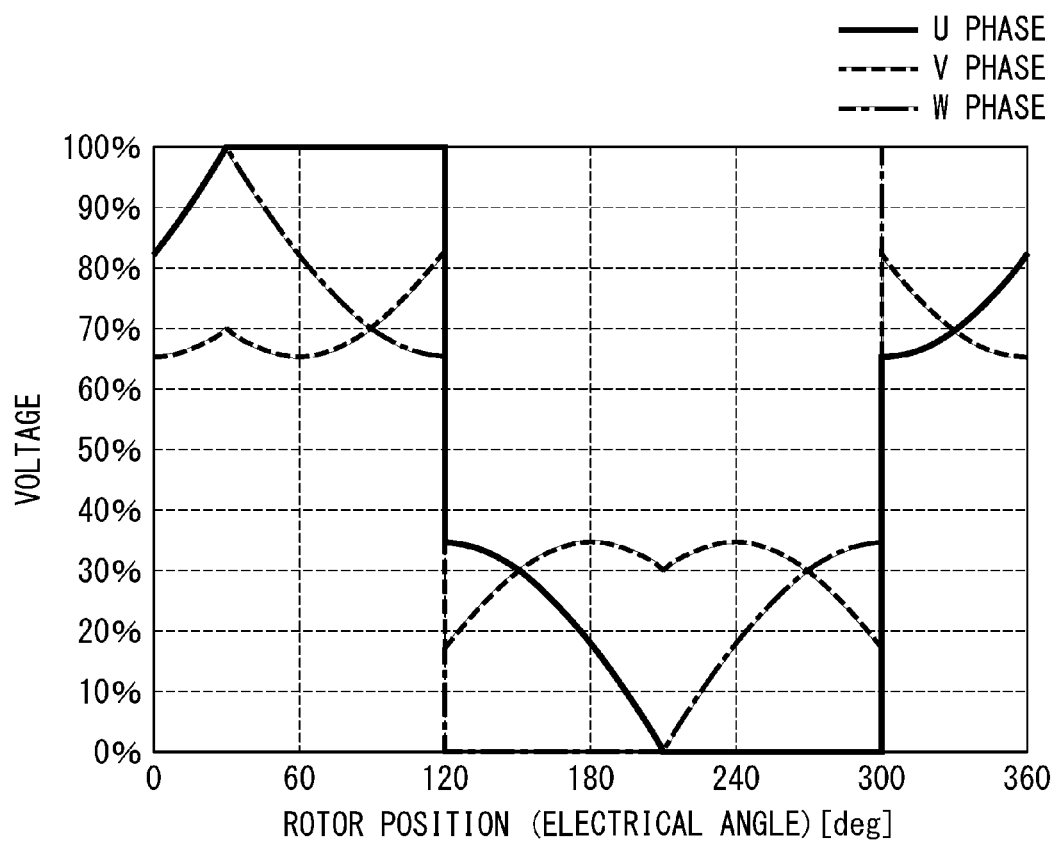
FIG. 11 is a view showing modulated three-phase voltage commands generated on the basis of the three-phase voltage commands shown in FIG. 7 in an inverter control apparatus according to the second embodiment of the present invention.

FIG. 11 shows the modulated three-phase voltage commands generated on the basis of the three-phase voltage commands shown in FIG. 7, and FIG. 12 is a view showing a relationship between the modulated three-phase voltage commands shown in FIG. 11 and the rotor position. In FIG. 12, "(OFF)" shows the full-off voltage, that is, the state where the duty is 0(%), and "(ON)" shows the full-on voltage, that is, the state where the duty is 100%.

Third Embodiment

Next, an inverter control apparatus and an inverter apparatus according to a third embodiment of the present invention will be described with reference to the accompanying drawings.

In the first or second embodiment described above, when the modulation of the command modulation sections is performed, the full-on voltage is set in a range of the rotor position, and the full-off voltage is set in another range of the rotor position, so that the full-on voltage and the full-off voltage appear alternately (see, for example, FIG. 8 and FIG. 11). In this way, when the full-on voltage and the full-off voltage are switched every 60 (deg) or 180 (deg) of the rotor position, the phase voltages are greatly changed at the moment of switching as shown in the following expression (1), and hence the neutral-point potential of the phases is fluctuated.

Neutral-point potential=(U-phase voltage+V-phase voltage+W-phase voltage)/3    (1)

Figure 13:
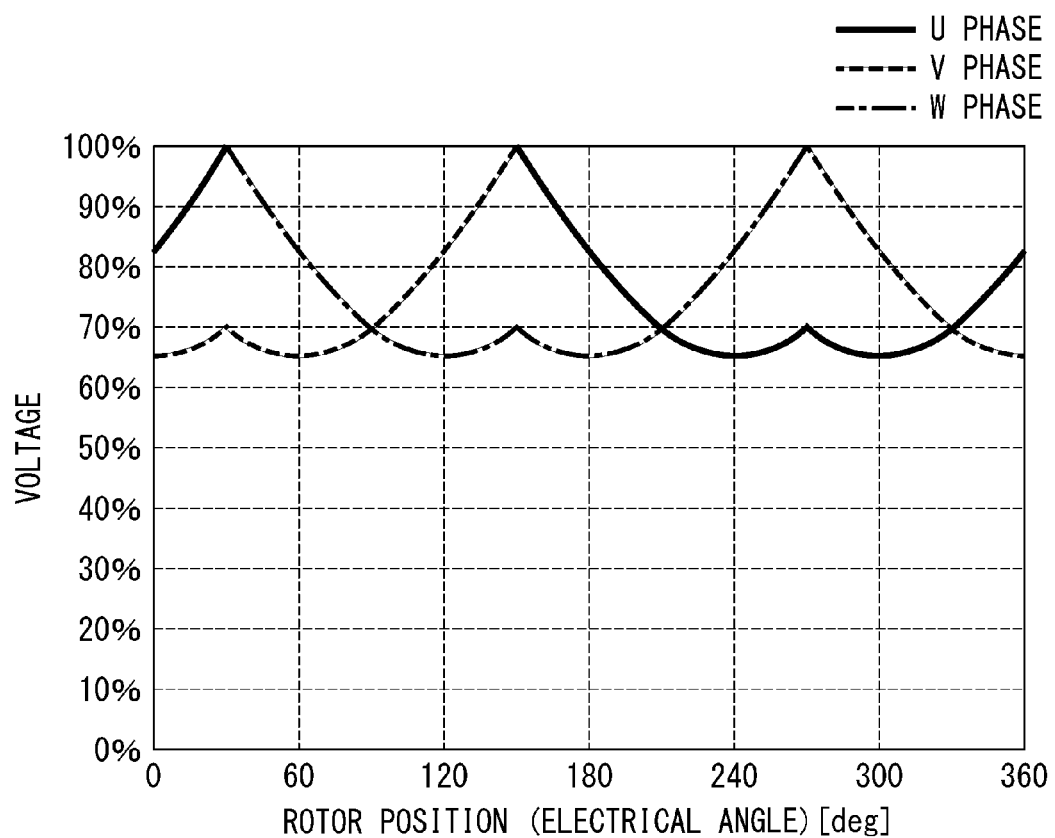
FIG. 13 is a view showing an example of modulated three-phase voltage commands when one of the three-phase voltage commands is always set to a full-on voltage in an inverter control apparatus according to a third embodiment of the present invention.
Figure 15:
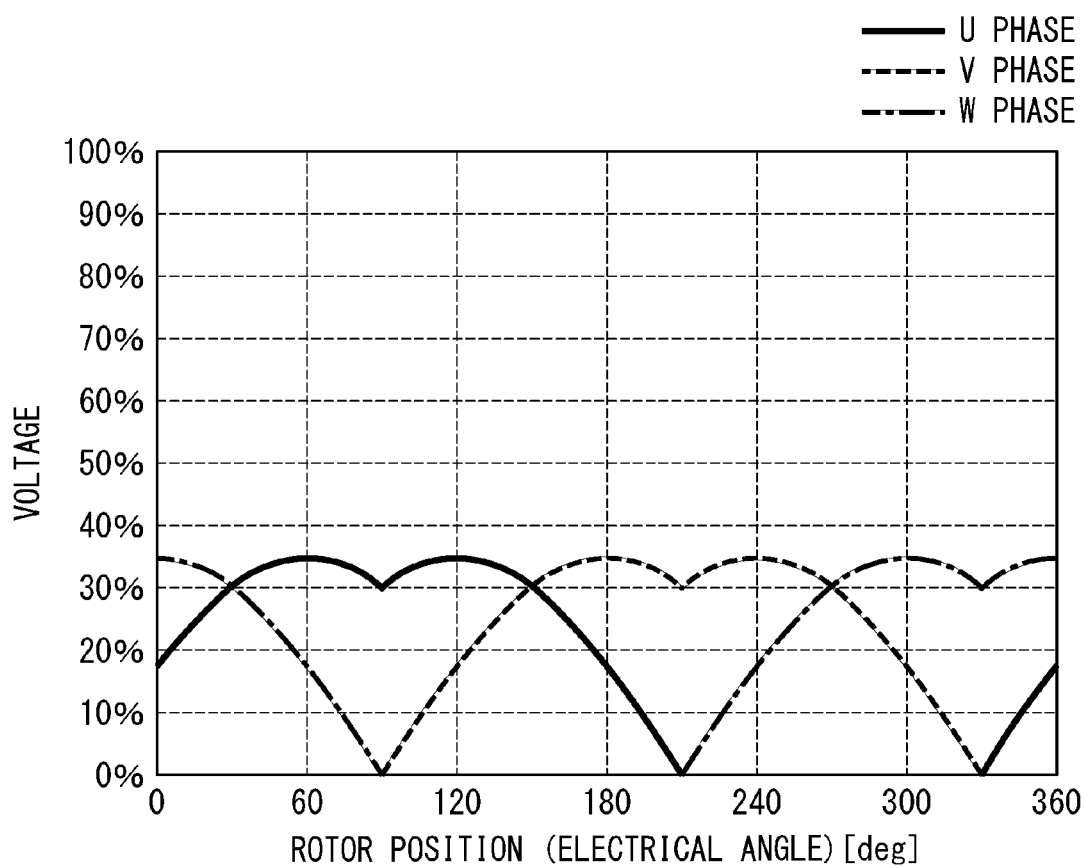
FIG. 15 is a view showing an example of modulated three-phase voltage commands when one of the three-phase voltage commands is always set to the full-off voltage in the inverter control apparatus according to the third embodiment of the present invention.

When the neutral point potential is fluctuated in this way, the ripple current may be increased. Therefore, in the present embodiment, the fluctuation of the neutral-point potential is suppressed by reducing the switching time of the full-on voltage and the full-off voltage. For example, FIG. 13 shows the three-phase voltage commands when, in the three-phase voltage commands shown in FIG. 7, the phase voltage command having the maximum value is always set to the full-on voltage, and FIG. 14 shows a relationship between the rotor position and each of the phase voltage commands in this case. FIG. 15 shows the three-phase voltage commands when, in the three-phase voltage commands shown in FIG. 7, the phase voltage command having the minimum value is always set to the full-off voltage, and FIG. 16 shows a relationship between the rotor position and each of the phase voltage commands in this case.

As described above, the fluctuation of the neutral-point potential can be suppressed by reducing the switching time of the full-on voltage and the full-off voltage, so that the ripple current can be suppressed.

The frequency of switching of the full-off voltage and the off-on voltage may also be reduced in such a manner that, instead that the phase voltage command is always set to the full-off voltage or the full-on voltage as described above, the switching between when the full-on voltage is adopted and when the full-off voltage is adopted is performed at a predetermined frequency. Here, it is preferred that "the predetermined frequency" described above is set to a frequency lower than the frequency of the carrier wave (for example, a frequency of several Hz or several tens of Hz).

In the PWM signal generation method according to the present embodiment, similarly to the second embodiment mentioned above, there is a range of the rotor position, in which range the current detection period cannot be sufficiently secured. Therefore, in such range of the rotor position, the method according to the first embodiment described above may be adopted, or the PWM signals may be generated by using the three-phase voltage commands generated by the voltage command generation section 12, instead of performing the two-phase modulation. In this case, the rotor positions, at which the PWM signal generation methods are switched, may be set beforehand, so that the PWM signal generation methods are switched according to each of the rotor positions.

In each of the embodiments described above, in addition to the method in which, in the command modulation section 13, the phase set to the full-off voltage or the full-on voltage is specified by mutually comparing the phase voltage commands from the voltage command generation section 12 at any time, there may also be used, for example, a method in which a table, associating the rotor position with the phase set to the full-off voltage or the full-on voltage as shown in FIG. 9 or the like, is prepared in advance, and in which the phase set to the full-off voltage or the full-on voltage is specified by referring to the table.

The present invention is not limited only to the above-described embodiments, and various modifications can be implemented, for example, by combining a part or all of the above-described embodiments with each other within the scope and spirit of the present invention.

REFERENCE SIGNS LIST

1 Inverter apparatus
2 Inverter
3 Inverter control apparatus
4 Driver circuit
5 Motor
6 Current sensor
7 DC power supply
8 Voltage sensor
11 Phase current calculation section
12 Voltage command generation section
13 Command modulation section
14 Carrier wave generation section
15 PWM signal generation section

The invention claimed is:

1. An inverter control apparatus applied to an inverter apparatus including an inverter which converts a DC voltage into an AC voltage and outputs the AC voltage to an AC motor, and a current sensor configured to measure a DC current on the input side of the inverter, the inverter control apparatus comprising:
   a phase current calculation section configured to calculate phase currents respectively flowing into the AC motor by using the measurement results of the current sensor;
   a voltage command calculation section configured to calculate three-phase voltage commands supplied to the AC motor by using the phase currents calculated by the phase current calculation section;
   a command modulation section configured to compare the phase voltage commands generated by the voltage command calculation section with each other, to specify a full-on phase or a full-off phase on the basis of the comparison result, to set the voltage command of the specified phase to a full-on voltage corresponding to duty 100% or a full-off voltage corresponding to duty 0%, to offset the voltage commands of the other two phases according to the full-on voltage or the full-off voltage, and to modulate voltage commands so as to allow the line voltage between the other two phases to be kept constant;
   a carrier wave generation section configured to generate a first carrier wave as a reference, a second carrier wave delayed from the first carrier wave by a fixed time, and a third carrier wave advanced from the first carrier wave by the fixed time; and
   a PWM signal generation section configured to generate PWM signals by comparing, according to a predetermined rule set in advance, each of the phase voltage commands modulated by the command modulation section with the three carrier waves generated by the carrier wave generation section.

2. The inverter control apparatus according to claim 1, wherein, among the three-phase voltage commands, the command modulation section specifies the phase of the voltage command having a minimum voltage value as a phase to be full off, and always sets the specified phase voltage command to the full-off voltage.

3. The inverter control apparatus according to claim 1, wherein, among the three-phase voltage commands, the command modulation section specifies the phase of the voltage command having a maximum voltage value as a phase to be full on, and always sets the specified phase voltage command to the full-on voltage.

4. The inverter control apparatus according to claim 1, wherein the command modulation section switches, at a predetermined frequency, between the period during which, among the three-phase voltage commands, the phase voltage command having a minimum voltage value is specified as a phase voltage command to be full off, and the period during which, among the three-phase voltage commands, the phase voltage command having a maximum voltage value is specified as a phase voltage command to be full on, and
   the predetermined frequency is set to be lower than a frequency of the carrier wave.

5. The inverter control apparatus according to claim 1, wherein the PWM signal generation section generates the PWM signals by comparing one of the other two phase voltage commands with the first carrier wave.

6. An inverter apparatus provided with the inverter control apparatus according to claim 1.

7. A vehicle-mounted air conditioner provided with an electric compressor using the inverter apparatus according to claim 6.

8. An inverter control method applied to an inverter apparatus including an inverter which converts a DC voltage into an AC voltage and outputs the AC voltage to an AC motor, and a current sensor which measures a DC current on the input side of the inverter, the inverter control method comprising:

a phase current calculation step of calculating each of phase currents flowing into the AC motor by using measurement results of the current sensor;

a voltage command calculation step of calculating three-phase voltage commands supplied to the AC motor by using the phase currents calculated in the phase current calculation step;

a command modulation step of mutually comparing the phase voltage commands generated in the voltage command calculation step, to specify a full-on phase or a full-off phase on the basis of a comparison result and then to set the voltage command of the specified phase to a full-on voltage corresponding to duty 100% or a full-off voltage corresponding to duty 0%, and offsetting the voltage commands of the other two phases according to the full-on voltage or the full-off voltage to modulate the voltage commands into voltage commands allowing the line voltage between the other two phases to be kept constant;

a carrier wave generation step of generating a first carrier wave as a reference, a second carrier wave delayed from the first carrier wave by a fixed time, and a third carrier wave advanced from the first carrier wave by the fixed time; and a PWM signal generation step of generating PWM signals by comparing, according to a predetermined rule set in advance, each of the phase voltage commands modulated in the command modulation step with the three carrier waves generated in the carrier wave generation step.

9. An inverter control method applied to an inverter apparatus including an inverter which converts a DC voltage into an AC voltage and outputs the AC voltage to an AC motor, and a current sensor which measures a DC current on the input side of the inverter, the inverter control program making a computer execute:

calculating each of the phase currents flowing into the AC motor by using measurement results of the current sensor;

calculating three-phase voltage commands supplied to the AC motor by using the phase currents calculated in the phase current calculation process;

mutually comparing the phase voltage commands generated in the voltage command calculation process, to specify a full-on phase or a full-off phase on the basis of a comparison result and then setting the voltage command of the specified phase to a full-on voltage corresponding to duty 100% or a full-off voltage corresponding to duty 0%, and offsetting the voltage commands of the other two phases according to the full-on voltage or the full-off voltage to modulate the voltage commands into voltage commands allowing the line voltage between the other two phases to be kept constant;

generating a first carrier wave as a reference, a second carrier wave delayed from the first carrier wave by a fixed time, and a third carrier wave advanced from the first carrier wave by the fixed time; and generating PWM signals by comparing, according to a predetermined rule set in advance, each of the phase voltage commands modulated in the command modulation process with the three carrier waves generated in the carrier wave generation process.

* * * * *